United States Patent
Krahnstoever et al.

(10) Patent No.: US 8,320,617 B2
(45) Date of Patent: Nov. 27, 2012

(54) SYSTEM, METHOD AND PROGRAM PRODUCT FOR CAMERA-BASED DISCOVERY OF SOCIAL NETWORKS

(75) Inventors: Nils Oliver Krahnstoever, Schenectady, NY (US); Ser Nam Lim, Niskayuna, NY (US); Ting Yu, Schenectady, NY (US); Kedar Anil Patwardhan, Niskayuna, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 855 days.

(21) Appl. No.: 12/412,486

(22) Filed: Mar. 27, 2009

(65) Prior Publication Data

US 2010/0245567 A1    Sep. 30, 2010

(51) Int. Cl.
*G06K 9/00* (2006.01)
(52) U.S. Cl. .................. 382/103; 348/143
(58) Field of Classification Search ........... 382/100, 382/103, 118; 348/143
See application file for complete search history.

(56) References Cited

U.S. PATENT DOCUMENTS

| | | | | |
|---|---|---|---|---|
| 5,844,599 | A * | 12/1998 | Hildin | 348/14.1 |
| 6,698,021 | B1 | 2/2004 | Amini et al. | |
| 6,870,563 | B1 * | 3/2005 | Kang | 348/222.1 |
| 7,023,469 | B1 | 4/2006 | Olson | |
| 7,227,569 | B2 * | 6/2007 | Maruya | 348/143 |
| 7,460,150 | B1 | 12/2008 | Coughlan et al. | |
| 7,806,604 | B2 * | 10/2010 | Bazakos et al. | 396/427 |
| 8,072,481 | B1 * | 12/2011 | McNelley et al. | 348/14.16 |
| 2008/0065701 | A1 | 3/2008 | Lindstrom et al. | |
| 2008/0103907 | A1 | 5/2008 | Maislos et al. | |
| 2009/0060289 | A1 | 3/2009 | Shah et al. | |
| 2009/0319288 | A1 * | 12/2009 | Slaney et al. | 705/1 |
| 2010/0002071 | A1 * | 1/2010 | Ahiska | 348/36 |

OTHER PUBLICATIONS

Stillman et al. "A System for Tracking and Recognizing Multiple People with Multiple Cameras," GVU Center, Technical Report #GIT-GVU-98-25, Aug. 1998.*

Park et al., "Multi-person interaction and activity analysis: a synergistic track- and body-level amalysis framework," Machine Vision and Applications, 2007, 18, pp. 151-166.*

Oh et al., "Examining the Diffusion of User-Generated Content in Online Social Networks", Jul. 28, 2008, pp. 1-39.

* cited by examiner

*Primary Examiner* — Brian P Werner
*Assistant Examiner* — Shefali Goradia
(74) *Attorney, Agent, or Firm* — MH2 Technology Law Group, LLP

(57) ABSTRACT

A system, method and program product for camera-based discovery of social networks. The computer implemented method for identifying individuals and associating tracks with individuals in camera-generated images from a face capture camera(s) and a tracking camera(s), wherein the computer implemented method includes: receiving images of an individual from the face capture camera(s) on a computer; receiving images of a track(s) of an individual from the tracking camera(s) on a computer; automatically determining with the computer the track(s) from the images from the tracking camera(s); and associating with the computer the track(s) with the individual(s) and a unique identifier. The present invention has been described in terms of specific embodiment (s), and it is recognized that equivalents, alternatives, and modifications, aside from those expressly stated, are possible and within the scope of the appending claims.

23 Claims, 7 Drawing Sheets

104 Tracking Camera(s):

102 Face Capture Cameras:

US 8,320,617 B2

SYSTEM, METHOD AND PROGRAM PRODUCT FOR CAMERA-BASED DISCOVERY OF SOCIAL NETWORKS

This invention was made with Government support under contract number 2007-RG-CX-K015 awarded by The Department of Justice. The Government has certain rights in the invention.

BACKGROUND OF THE INVENTION

The present invention relates generally to intelligent camera systems and more particularly to a system, method and program product that may employ camera systems in order to discover social networks.

Video-based site surveillance systems are currently employed in a variety of public, private, and semi-public settings including, schools, parks, shopping malls, neighborhoods, prisons and prison yards, and the like. Some advances have been made in camera systems to include, for example, facial recognition via images gathered from the automated camera systems. Typically though, imagery is gathered from the system only after a crime, or series of crimes, has occurred for analysis in order to attempt to aid in solving the crime or providing post-crime improvements (e.g., changing security personnel and/or equipment, etc.).

In order to attempt to improve predictive security efforts, law enforcement attempt to gain a high level understanding of crowd behavior in terms of interaction and social network patterns. A social network consists of groups of people with a pattern of interactions between them and the understanding of such social networks in various environments, such as prisons or public venues is of great interest to law enforcement and homeland security. There is an increasing need to identify cohesive groups and their leaders for security purposes. It is thought that being able to identify, for example gangs and their leaders, including any changes to those structures over time, would be of great value to the security industry. Ultimately, any improvement in identifying these various social structures before the crime(s) is committed can only aid security and law enforcement efforts in their efforts.

Heretofore, these identification efforts have typically been limited to personnel manually observing social relationships in areas either in real-time by actual observation (e.g., prison guard watching prison yard), watching camera feeds on video screens (e.g., security guard in video command center), and/or personnel reviewing video data collected after the fact. All of these methods are time consuming and highly inefficient.

Accordingly, there is an ongoing need for further improving the "intelligence" of video-based site surveillance systems.

BRIEF DESCRIPTION

The present invention overcomes at least some of the aforementioned drawbacks in camera systems by providing a methodology that improves the "intelligence" of the camera system. More specifically, the present invention is directed to provide a system, method and program product for discovering social networks from imagery received from a camera system.

Therefore, in accordance with one aspect of the invention, a computer implemented method for identifying individuals and associating tracks with individuals in camera-generated images, wherein the camera-generated images are from a camera system comprising at least one face capture camera and at least one tracking camera, said computer implemented method includes: receiving a plurality of images of an individual from the plurality of face capture cameras on a computer; receiving a plurality of images of at least one track of an individual from the at least one tracking camera on a computer; automatically determining with the computer the at least one track from the plurality of images from the at least one tracking camera; and associating with the computer the at least one track with at least one of the individual and a unique identifier.

In accordance with another aspect of the invention, a system for identifying individuals and associating tracks with individuals includes: at least one camera configured to obtain a plurality of images of at least two individuals; a computer configured to process the plurality of images, wherein the computer: receives a plurality of images of the at least two individuals from the at least one camera; automatically determines at least two tracks from the plurality of images of the at least two individuals; associates the at least two tracks of the at least two individuals each with unique identifiers; and automatically identifies a social network from the at least two individuals that have been associated with unique identifiers.

In accordance with another aspect of the invention, a computer implemented method for identifying individuals and associating tracks with individuals in camera-generated images, wherein the camera-generated images are from a camera system comprising at least one face capture camera and at least one tracking camera, said computer implemented method includes: receiving a plurality of images of the at least two individuals from the at least one camera; automatically determining at least two tracks from the plurality of images of the at least two individuals; associating the at least two tracks of the at least two individuals each with unique identifiers; and automatically identifying a social network from the at least two individuals that have been associated with unique identifiers.

In accordance with another aspect of the invention, a computer-readable media having computer readable instructions recorded thereon for identifying individuals and associating tracks with individuals in camera-generated images, wherein the camera-generated images are from a camera system comprising at least one face capture camera and at least one tracking camera, the instructions include: instructions for receiving a plurality of images of an individual from the plurality of face capture cameras; instructions for receiving a plurality of images of at least one track of an individual from the at least one tracking camera; instructions for automatically determining the at least one track from the plurality of images from the at least one tracking camera; and instructions for associating the at least one track with at least one of the individual and a unique identifier.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention offer advantages over previous systems that employ camera systems. The system, method, and program product is able to address the important problem of discovery and analysis of social networks from surveillance videos. Under aspects of the present invention, the solution to this problem is made possible by video data obtained from camera systems or networks, in particular state-of-the-art face capture (e.g., Pan-Tilt-Zoom (PTZ), mega-pixel, etc.) and tracking camera systems, that have the capability to acquire both high-resolution face images and "tracks" of people under challenging conditions. Aspects of the present invention perform facial recognition on captured images and compute motion similarities between tracks of people on a ground plane. In order to address any unknown correspondences between faces and tracks obtained, the invention employs a novel graph-cut based algorithm to solve this association problem. As a result, a social network that captures the interactions between individuals, in spite of large amounts of noise in the dataset, is estimated in a robust fashion. In other embodiments of the invention, an Eigen-analysis based algorithm, entitled a "modularity-cut" algorithm, may be employed in order to further discover community and leadership structure within the social network. Ultimately, the present invention offers an "intelligent" system that may be employed with a multi-camera system so as to yield a fully integrated system that offers results under challenging conditions over long periods of time.

Clearly, gaining a better understanding of crowd behavior in terms of interaction and social network patterns is helpful in law enforcement and security efforts. A social network is defined as a group of people with a pattern of interactions between them. Understanding such social networks, in environments such as public venues, prisons, and schools in particular, is of great interest to law enforcement and homeland security. Being able to identify cohesive groups, herein called social groups, and their leaders is desirable for security purposes. Embodiments of the present invention are able to reliable perform tasks including persistently tracking an individual under occlusions; and uniquely recognizing an individual on a watchlist using face detection and recognition. The effective tracking and recognition allows the system to detect individuals that are often "seen" together and then assign them to the same social group. Centralized tracking in a common coordinate system aids the multi-camera system in tracking. Further, obtaining high-resolution images from the camera system aids in face recognition.

Figure 1:
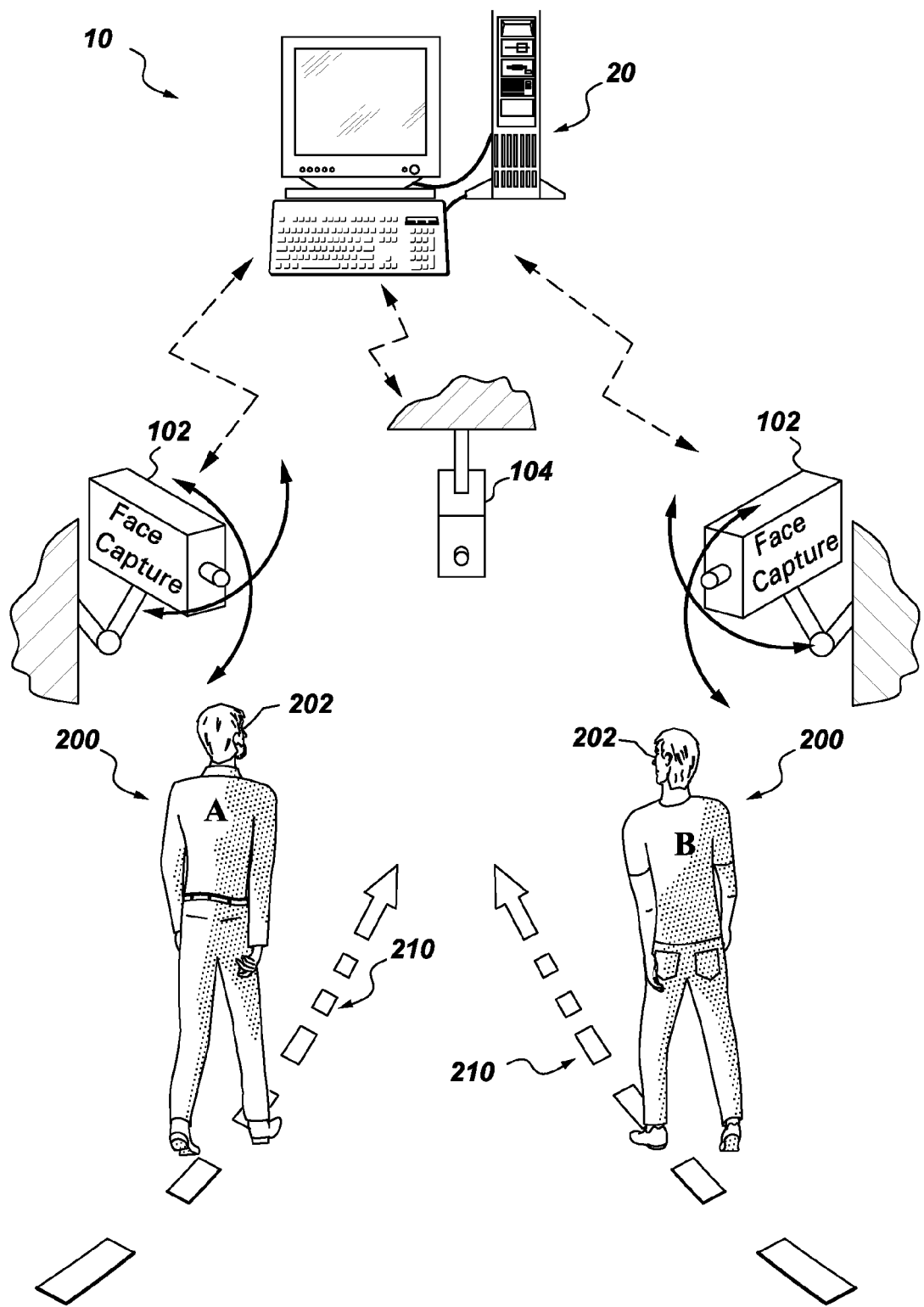
FIG. 1 is a schematic diagram of a system for discovering social networks incorporating aspects of the present invention.

Referring to FIG. 1 a high-level schematic diagram of a system for discovering social networks, or system 10, in accordance with embodiments of the present invention is shown. The system 10 includes a computer 20 that interacts with and receives a plurality of images from a camera system 100. In an embodiment, the camera system 100 includes at least one, often a plurality of, face capture (e.g., pan tilt zoom (PTZ)) cameras 102 and at least one tracking (e.g., still, fixed, etc.) camera 104. Further details of the various modules contained in the computer 20 are discussed herein and are depicted in more detail in FIG. 7.

In any event, the system 10 working in consort with the camera system 100 is able to discover social networks based on data collected from images received from the camera system 100. In an embodiment the images received from the camera system 100 include images of individuals 200 (e.g., images of faces 202) obtained by the face capture cameras 102 and images of individuals with estimated tracks 210 obtained from the tracking camera(s) 104. In this manner, system 10 while employing novel algorithms to the image data is able to accurately associate tracks 210 with individuals 200 thereby ultimately identifying social networks and any social groups therein. FIG. 1 shows two individuals 200 (depicted as "A" and "B") walking along tracks 210 where there may potentially be a connection between the two individuals A, B.

While the embodiment of the system 10 shown in FIG. 1 depicts only interacting with a camera system 100 having two face capture (e.g., PTZ) cameras 102 and one still camera 104, clearly other configurations and embodiments exist under the present invention. Further, while the social network discovery system 10 may be a stand-alone system that may communicate with any now known or later developed camera system 100, in other embodiments the camera system may be incorporated with the system 10 into a single seamless system. In particular, depending on the tracking system, in an embodiment one can also replace the face capture and tracking camera(s) with a single PTZ camera or a single fixed high-resolution (e.g., mega-pixel, catadioptric, etc.) camera that performs both tracking and face capture.

Figure 2:
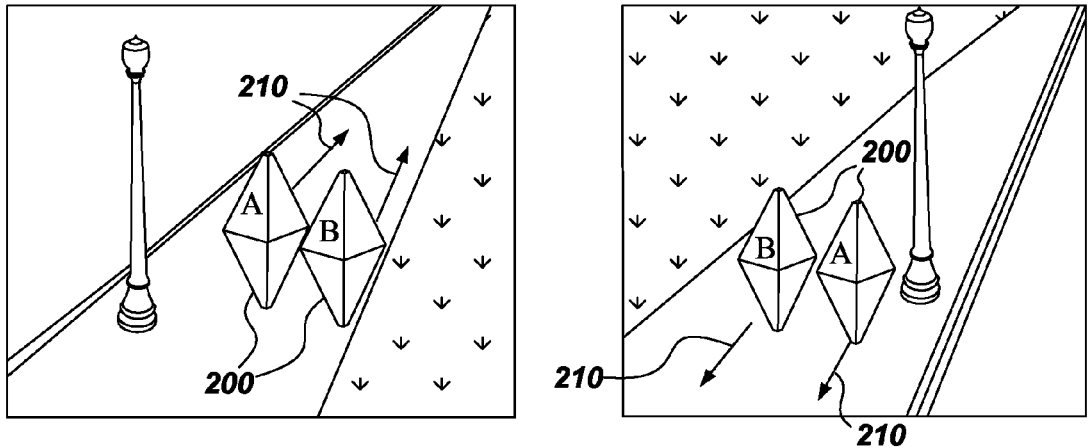
FIG. 2 is a schematic diagram of a portion of the discovery of a social network according to an embodiment of the present invention.
Figure 2:
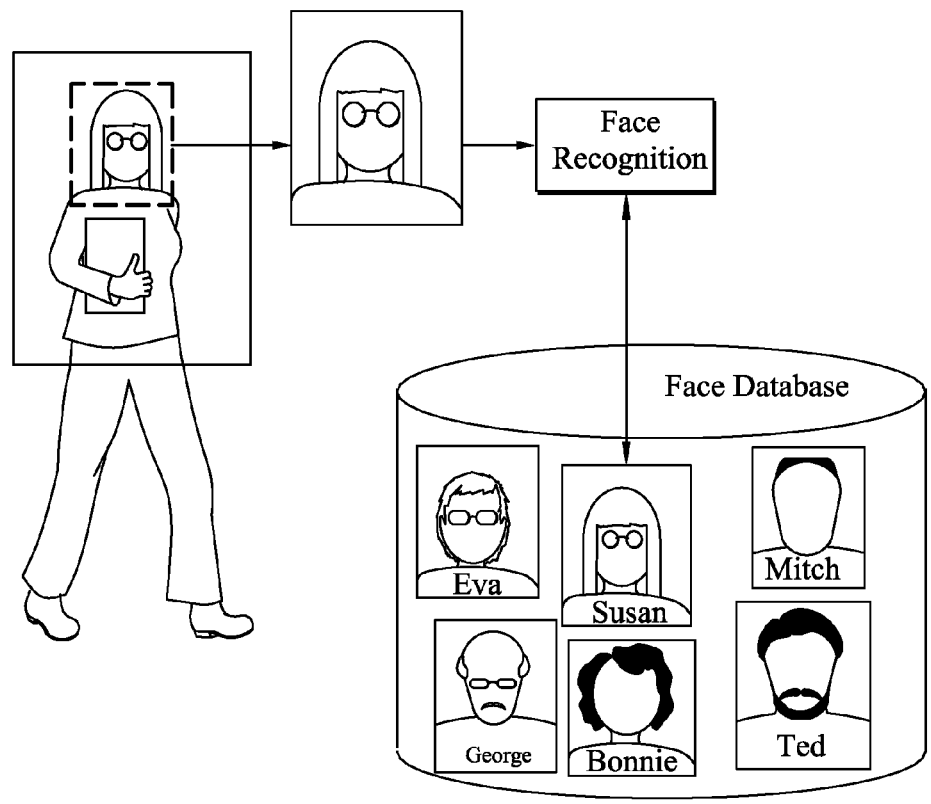

Referring to FIG. 2 the discovery of social networks may start with person tracks obtained from tracking camera 104 views are then used to control the face capture cameras 102 to capture face images. Faces recognized from these images and person tracks are in turn used to build the social network. The social interactions captured by the social network form the basis for the subsequent discovery of any social groups within the social network. For example, as FIG. 2 shows, two different tracking cameras 104 are obtaining track 210 images of the two individuals 200 (A, B) from FIG. 1 as they walk along a path. The tracking camera 104 on the left has obtained track 210 images of the individuals 200 (A, B) as they walk away from the tracking camera 104; tracking camera 104 on the right has obtained track 210 images of the individuals 200 (A, B) as they walk towards the tracking camera 104. Similarly, at least one face capture 102 camera obtains a face 202 image of an individual 200 and the system 10 is able to perform face recognition on the face images by comparing to a face database. As depicted, the face image is recognized as belonging to "SUSAN" from the face database.

An embodiment of the method includes discovering a social network. The identities of individuals are maintained with respect to a (possibly dynamically generated) watchlist of faces. During tracking, individuals are identified by performing face recognition. As a result, the system "reasons" about interactions between different individuals (e.g., Joe and Frank have been together for the last five minutes). In this manner, connections between individuals represented in a social network graph, who are frequently seen together, become progressively stronger over time. The nodes in the social network graph represent the individuals as identified by their faces and the edges are weighted according to the observed connectionism between nodes. The social network graph may be built over time, in real-time, offline, at a later time, or by other means, as long as the individual tracks and captured face images are adequately obtained and stored.

As part of constructing a social network a social network graph, G=(V, E), is built, wherein V consists of a set of nodes and E, consists of a set of edges. Each node, V, represents an individual in the society and may be assigned a name and signature (e.g., face image and other identifying information). In a closed-world environment, the quantity of nodes, N, equals the quantity of signatures on a given watchlist. In order to construct the social network graph, G, the social connection strength, $A_{ij}$, between two objects (e.g., individuals), i and j, is estimated. The estimation of the connection strength, $A_{ij}$, is based on the following guidelines or factors: positively recognize both individuals, i and j; quantify with a suitable metric the interaction between individuals, i and j; and, measure over time the frequency with which the individuals, i and j, are seen together. In this manner the knowledge gained over time is aggregated from the first two guidelines over the lifespan of a given set of tracks and recognized faces.

In order to achieve the aforementioned guidelines, a face recognition engine is employed to recognize faces detected in the captured and received images. From the face recognition engine a discrete probabilistic histogram is obtained. The histogram, $P=[p^1, \ldots, p^N]$, wherein each histogram bin, $p^i$, measures the probability that the recognized face correspond to individual i. The index, i', of the bin with the highest value is thus, in a probabilistic sense, the ID of the individual. Given a pair of histograms (p, q), and i'=arg $\max_i p^i$, j'=arg $\max_j q^j$, the social connection link $A_{i'j'}$ is updated with the degree of interactions between individual i' and j', which is modeled as the motion similarity of i' and j' and weighted by the face recognition uncertainty.

Thus, given a total of M tracks, each track m∈M is denoted by the equation:

$$X_m = \{x_m^{t_{m,0}}, \ldots, x_m^{t_{m,\tau}}\},$$

where $x_m^t$ is the 3D ground plane location at time t, and $t_{m,0}$ and $t_{m,\tau}$ are the start and end time of the track. Given a pair of tracks, $(X_m, X_n)$, which temporally overlaps between $(t_0^{mn}, t_\tau^{mn})$, where:

$$t_0^{mn} = \max(t_{m,0}, t_{n,0}), \; t_\tau^{mn} = \min(t_{m,\tau}, t_{n,\tau}),$$

the motion similarity between the two is thus quantified as:

$$D_{mn} = \exp\left(-\frac{\sum_{t=t_0^{mn}}^{t_\tau^{mn}} \|x_m^t - x_n^t\|^2}{2\sigma_{loc}^2 (t_\tau^{mn} - t_0^{mn})}\right),$$

such that as the more consistently two tracks of individuals move together, the larger the similarity $D_{mn}$ is. In the above equation, $\sigma_{loc}$ is a scaling factor that controls the influence of the variations between the tracks' locations.

Based on the preceding equation, the rule for updating $A_{i'j'}$ for a pair of recognized faces, (p, q), and their tracks, $(X_m, X_n)$, is defined as:

$$A_{i'j'} = A_{i'j'} + D_{mn}(\exp^{-\alpha H(p)} p^{i'} + \exp^{-\alpha H(q)} q^{j'}).$$

In this equation noisy recognition is mitigated by the entropy measure H(.). For a histogram p, the larger H(p) is, or equivalently, the more uniformly distributed histogram p is, which indicates ambiguous recognition, the smaller, $\exp^{-\alpha H(p)}$ would be and, hence, the lesser the influence on $A_{i'j'}$. Additionally, the preceding equation shows that the links are being continuously updated with all valid pairs of faces and their corresponding tracks. Accordingly, the more frequently the system has "seen" the individuals together, the stronger the link is.

Once suitable face recognition has been performed and tracks have been obtained, the method associates the various faces with the tracks via a graph-cut. In order to use the aforementioned equation to update social links, faces from PTZ cameras and tracks estimated from fixed cameras need to be associated with each other. There are several challenges that the system resolves in associating faces to tracks. For example, during a face capture, the images that are acquired from a PTZ camera might capture one or more faces in different parts of the image. As a result, the detected faces are projected into 3D space in order to be associated with the tracks. The projection requires estimating the projection matrix of the PTZ camera as it moves, which may be inaccurate depending on how accurate the PTZ motor location that is provided by the camera system. Several faces might be detected within a single PTZ view at the same time, which can make it difficult to associate tracks using a simple distance metric due to the proximity of these individuals. Additionally, the fact that faces must clearly belong to different tracks needs to be taken into consideration during the track to face association. Contrastingly, faces from different PTZ views could belong to the same individual and should not be used to update the network.

Figure 3:
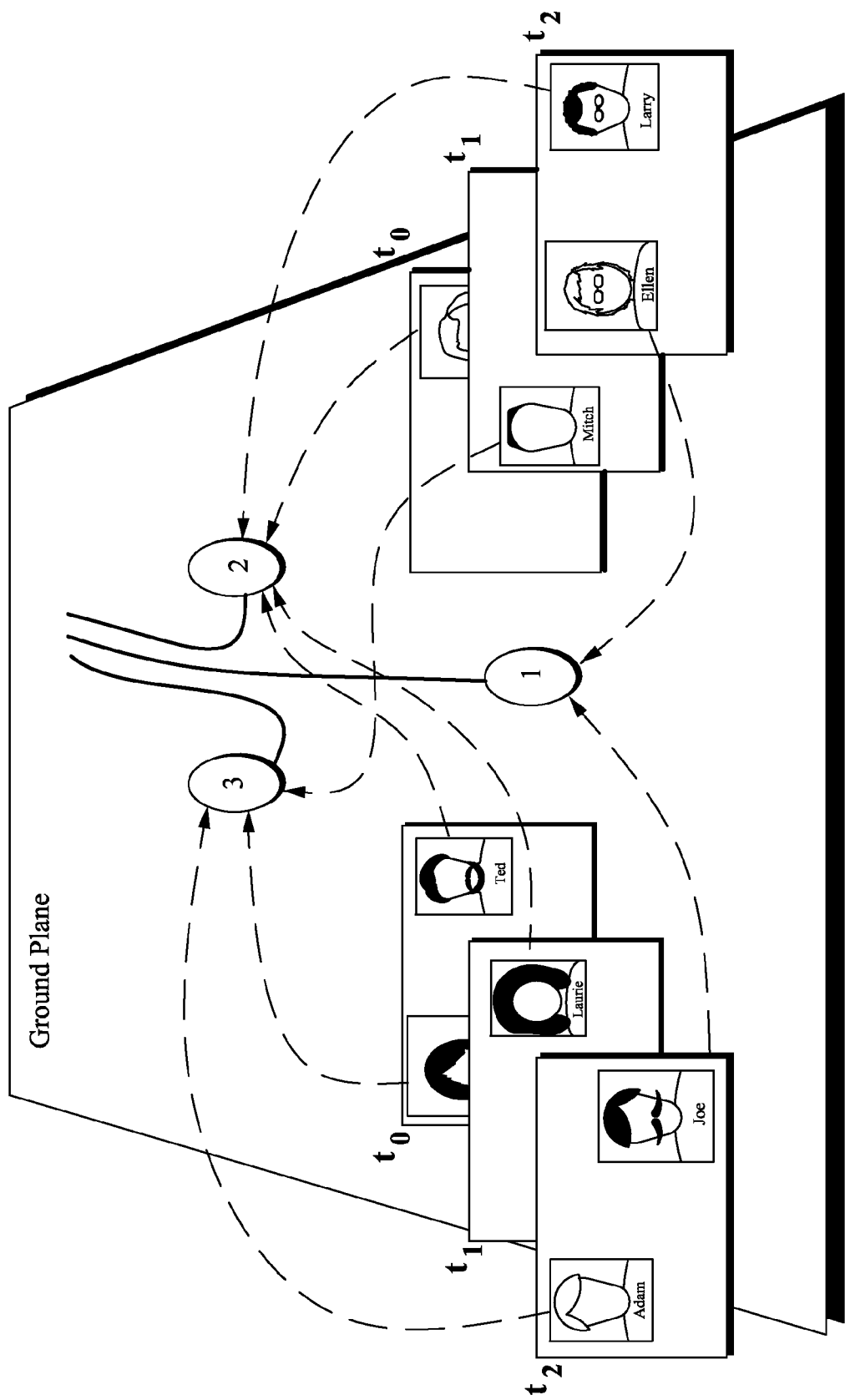
FIG. 3 is a schematic diagram of the association of faces-to-tracks according to an embodiment of the present invention.

FIG. 3 depicts a schematic view of an embodiment of a face-to-track association taking place. As schematically shown, two face capture cameras 102 (i.e., camera on left; camera on right) and a single tracking camera 104 are obtaining face image data and tracking image data, respectively. The face capture cameras 102 (face capture 1, face capture 2) are each obtaining face image data at three different times, $t_0$, $t_1$, and $t_2$. Similarly, tracking camera 104 obtains tracking image data for three separate tracks of individuals (e.g., labeled 1, 2, and 3). As discussed herein a face recognition algorithm is performed at each of times $t_0$, $t_1$, and $t_2$ in an attempt to identify the faces, and thereby each of the individuals, of the tracks). For example, at $t_0$, the first face capture camera 102 (camera on left) estimates that track 3 is a "Jill" while track 2 is "Ted". Similarly, at $t_1$ and $t_2$, the first face capture camera 102 (camera on left) estimates that track 2 belongs to "Laurie" and tracks 3 and 1 may belong to "Adam" and "Joe", respectively. The second face capture camera 102 (camera on right) performs similar face-to-track association attempts. For example, at $t_0$, the second face capture camera estimates that track 2 belongs "Joan". Similarly, at $t_1$ and $t_2$, the second face capture camera 102 (camera on right) estimates that track 3 belongs to "Mitch" and tracks 2 and 1 may belong to "Larry" and "Ellen", respectively. In this manner, the system 10 is able to eventually accurately associate the tracks 1, 2 and 3 with certain individuals and/or their identifier.

Embodiments of the present invention are able to build a social network that overcomes several of these challenges so as to build a social network that is a realistic representation of the true social interactions between individuals. A set of R detected faces is denoted by $F = \{f_1, \ldots, f_R\}$, and each capture $f_r$, r∈R, contains:

$$f_r = (x_r, \Sigma_r, p_r, t_r, c_r),$$

where $t_r$ is the time of capture, $c_r$ is the index of the PTZ camera that performs the capture, $x_r$ is the 3D ground plane location of the face computed by backprojecting the detected 2D face location using the estimated projection matrix, $Pm_r$, of $c_r$ at $t_r$, $\Sigma_r$ is the backprojection variance due to errors in the face location and noisy projection matrix estimating, and finally, $p_r$ is the face recognition histogram discussed above.

Let the set of M tracks be $X=\{X_1, \ldots, X_M\}$, where each track $X_m$ is defined as in: $X_m=\{x_m^{t_{m,0}}, \ldots, x_m^{t_{m,\tau}}\}$. The association problem is then to assign a label l to $f_r$ so that $l_r \in \{0, 1, \ldots, M\}$ indicates the track this capture belongs to. An extra label 0 is introduced to take care of outlier situations, such as missing tracks and/or face captures that are false positives.

One solution to the difficulty of accurately associating faces to tracks is to employ a Markov Random Field (MRF) framework using a multi-way graph-cut algorithm to solve the association. Using the MRF formulation, the site set over all face captures F is defined with |F|=R, and the label set over X with |X|=M+1 (after adding the missing track with label l=0). In this framework, an optimal labeling, $L^*=(l^*_1, \ldots, l^*_R)$, where $l^*_R \in \{0, 1, \ldots, M\}$, for all sites by minimizing the following energy function:

$$E(L) = \sum_{r \in R} D(l_r) + \sum_{r,s \in N} V_{r,s}(l_r, l_s),$$

where the data term, $D(l_r)$, is for evaluating the cost of assigning the face capture $f_r$ (site r) to track $X_{l_r}$ (label $l_r$), and the pairwise smoothness term, $V_{r,s}(l_r, l_s)$, is for computing the cost of assigning the sites (r, s) (face captures ($f_r$, $f_s$)) to labels ($l_r$, $l_s$), and N specifies some neighborhood system.

In order to manage detected faces from the multiple PTZ views, N consists of three edges types, denoted as $N_1$, $N_2$, and $N_3$. $N_1$ denotes the edge between a pair of faces if they are captured form the same camera view at the same time. $N_2$ denotes the edge between a pair of faces if they are captured from the same camera view but at two successive time slots. Finally, $N_3$ denotes the edge between a pair of faces if they are captured from two different camera views at the same time. For the data term, $D(l_r)$, a strategy is adopted that if the 3D face location is closer to one of the track locations than the other track locations at the capture time $t_r$, this face would be more likely to be assigned to this particular track.

Thus, for $l_r=0$ (i.e., the face capture is assigned to a null, or missing track):

$D(l_r)=\delta$.

While for $l_r \neq 0$, we have:

$D(l_r)=d_m(x_{l_r}^{t_r}; x_r, \Sigma_r)$, if $t_r \in (t_{l_r}, 0, t_{l_r}, \tau)$;

Otherwise $D(l_r)=\infty$, where $x_{l_r}^{t_r}$ is the estimated location of track $X_{l_r}$ at time $t_r$, ($t_{l_r}$, o, $t_{l_r}$, $\tau$) defines the lifespan of this track, dm (~) is the Mahalanobis distance defined by:

$d_m(x; \mu, \Sigma) = \sqrt{(x-\mu)^T \Sigma^{-1}(x-\mu)}$, and $\delta$ is set to be some penalty cost for assigning a face to a null track.

Because the neighboring edges might be of types {$N_1$, $N_2$, $N_3$}, the smoothness term is defined accordingly as:
1) For (r, s)$\in N_1$, $V_{r,s}(l_r, l_s)=-\infty$ if $l_r \neq l_s$; otherwise $=\infty$.
2) For (r, s)$\in N_2$, $N_3$ $V_{r,s}(l_r, l_s)=-0.5\exp\{-\beta d_b(p_r, p_s)\}^*$ ($d_m(x_r; x_s, \Sigma_s)+d_m(x_s; x_r, \Sigma_r)$), if $l_r \neq l_s$; otherwise =0;
where $d_b(p_r, p_s)$ is the Bhattacharyya coefficient of two histograms defined as:

$$d_b(p_r, p_s) = \sum_{i=1}^{N} \sqrt{p_r^i p_s^i}.$$

Thus, in the case of $N_1$, if they are correctly assigned to two different tracks, there is a tremendous payoff of $-\infty$. For cases $N_2$ and $N_3$, the payoff for assigning two faces to different tracks depends on the Mahalanobis distances between $x_r$ and $x_s$, and the similarity between their face recognition histograms evaluated by the Bhattacharyya coefficient. The more distant (in space) the faces are from each other and the more dissimilar their face recognition histograms are, the larger the payoff.

The method uses the multi-way graph-cut algorithm to solve the equation $$E(L) = \sum_{r \in R} D(l_r) + \sum_{r,s \in N} V_{r,s}(l_r, l_s),$$

so as to generate a solution within a known factor of the optimal. In this manner, the resultant face-to-track associations can then be utilized for updating the social links as presented above.

Figure 4:
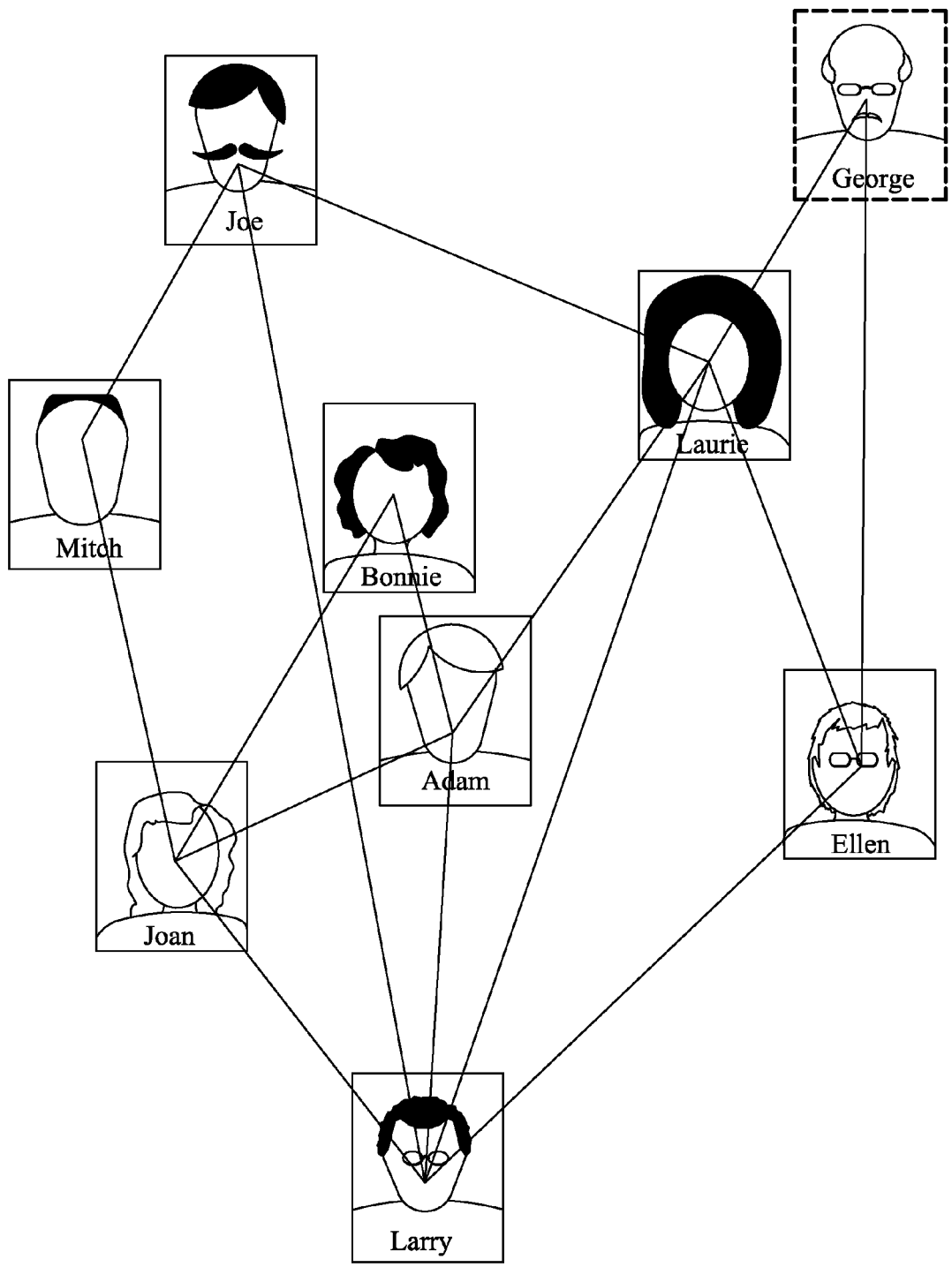
FIG. 4 is a schematic diagram of a social network graph created according to an embodiment of the present invention.

Once the social network is constructed, the method is able to determine one or more social groups contained in the social network. An exemplary social network graph that is constructed in accordance with an embodiment of the present invention is depicted in FIG. 4. The social network depicted in the graph includes "Joe", "Mitch", "Bonnie", "Adam", "Joan", "Larry", "Laurie", "Ellen", and "George".

After the social network is built, then the community structure (e.g., social groups contained therein) is determined. A social group is defined as a cohesive group of individuals that are frequently seen together. Often individuals in the same social group display strong connections between one another in the social network. An ensuing problem is to divide the social network into subgraphs in away that maximizes connections between nodes in each subgraph and minimizes connections between different subgraphs.

In accordance with aspects of the present invention a next step includes dividing or identifying the social groups within the social network. An advantage of the present invention includes the ability to divide the social network into a number that need not be predetermined. Thus, one does not have to know, or estimate, the quantity of social groups beforehand. In this manner, the method attempts to maximize the modularity measure, which expressed the difference between the actual and expected connections of individuals within each social group. The inventors have termed this technique the "modularity-cut" for identifying social groups.

Consider the notion that two individuals, i and j, are strongly connected only if their connection is stronger than what would be expected between any pair of individuals:

$$B_{ij} = A_{ij} - \frac{k_i k_j}{2m},$$

where $A_{ij}$ is the connection strength between i and j, $k_i$ and $k_j$ are the total connection strengths of i and j (i.e., $k_i=\Sigma_j A_{ij}$), and $$m = \frac{1}{2}\sum_{ij}$$

$A_{ij}$ is the total strength of all connections in the social network graph. The term $$\frac{k_i k_j}{2m}$$

represents the expected edge strength, so that the further an edge ($A_{ij}$) deviates from expectation, the stronger the connection. From the equation $$B_{ij} = A_{ij} - \frac{k_i k_j}{2m},$$

the modularity measure, Q, is derived as:

$$Q = \frac{1}{2m} \sum_{\substack{i,j \in \\ same \\ group}} B_{ij} = \frac{1}{4m} s^T B s,$$

where s is a labeling vector with each element, $s_i$, corresponding to an individual (node) in the social network graph. $s_i$=+1 if node i is assigned to the first group and $s_i$=−1 if node i is assigned to the second. B is the modularity matrix whose elements are $B_{ij}$. In this manner, each time a graph is divided into two subgraphs, as opposed to just minimizing cut size, modularity Q is maximized using S. By maximizing Q within-group connections that are stronger than expected are favored and so are weaker than expected between-group connections (the cut).

Determining s that maximizes Q can be shown to be NP-hard. A method based on Eigen-analysis may be employed to give a good approximation of our problem. An eigen decomposition is first performed where $B = \sum_i \beta_i u_i u_i^T$ with eigenvalues $\beta_i$ and eigenvectors $u_i$. By substituting into the equation:

$$Q = \frac{1}{2m} \sum_{\substack{i,j \in \\ same \\ group}} B_{ij} = \frac{1}{4m} s^T B s,$$

results in obtaining the following equation:

$$Q = \frac{1}{4m} \sum_i (u_i^T s)^2 \beta_i.$$

From this equation several observations may be made including if one lets $s=u_i$, then since the eigenvectors are orthogonal, $u_{j|j \neq i}^T s = 0$. Further, since s is constrained to be ±1, s cannot be directly assigned to an eigenvector, which is real valued. Otherwise, Q could be maximized by setting s equal to the dominant eigenvector, $u_{max}$. However, $s_i$ can be assigned to +1 if the corresponding element in the dominant eigenvector is positive, and −1 otherwise. That is:

$s_i$=+1 if $(u_{max})_i \geq 0$ and $s_i$=−1 if $(u_{max})_i < 0$, where $(u_{max})_i$ is the $i^{th}$ element of $u_{max}$. In doing so, an assumption is made that s remains close to being orthogonal to the other eigenvectors so that majority of the mass of the summation will come from the largest eigenvalues, thereby resulting in the largest Q. It has been shown that this assumption holds well in practice. Additionally, if none of the eigenvalues are positive, it implies that, based on the modularity measure, there should be no division, which is desirable. Because the present invention maximizes modularity, the prior problem of placing all the nodes in the social network graph into a single group due to the trivial case of zero cut size is avoided.

While dividing a graph into two subgraph is described herein, clearly the methodology may be extended to finding multiple social groups by applying the modularity-cut recursively to each subgraph. For this purpose, it is possible for an element in $u_{max}$ to have a value extremely close to zero. In such cases, regardless of the signs of the elements, they should be assigned to the same subgraph. This is because by being ≈0, these elements do not belong to either group, and should be kept together just in case subsequent divisions determine that they belong to the same group.

To ensure that the contributions to the modularity measure generated by subsequent divisions is correctly computed, such contributions must be related to the original graph. This may be done by removing the edges to the other subgraphs. However, this results in maximizing the wrong modularity measure.

An n×c community structure matrix, S, is defined where n is the number of nodes in the social network graph and c is the number of social groups. The number of social groups is started as c=1 (i.e., there is only one group which is the entire social network graph), but c increases as the social network graph is recursively divided into multiple groups. The (i, j)$^{th}$ element of S is 1 if node i belongs to social group j, and 0 otherwise. It is obvious that the modularity can be equivalently measured as:

$$Q = Tr(S^T B S),$$

where Tr represents the trace operator, and B is the original modularity matrix. Based on the aforementioned equation, the strategy for dividing into multiple social groups is as follows. Each time a new social groups is obtained, a new community structure matrix, S', is generated with an additional column corresponding to the new group. Denoting the modularity for S' as Q' and the largest Q in the recursion so far as $Q_{max}$, the contribution, $\Delta Q$, to the modularity measure is simply:

$$\Delta Q = Q' - Q_{max},$$

such that if, $\Delta Q \leq 0$, the new group is "discarded". It is much simpler to check for zero or negative contribution to the modularity before terminating the division process than, for example, using pre-specified cut size as the termination condition.

In another embodiment of the present invention, the leader of a social group is identified. Based on $$Q = \frac{1}{4m} \sum_i (u_i^T s)^2 \beta_i,$$

the modularity-cut approach provides a simple way to identify the leader of the social group. The leader, l, of the social group is found as $$l = \underset{i}{\arg\max} (u_{max})_i.$$

Elements of the dominant eigenvector with large magnitudes make large contributions to the modularity.

The social network graph is constructed on the basis of the frequency of which individuals are seen together. The leader of a social group, G, can be thought of as the individual, l, in the group that was seen, on average, most frequently with everyone else in the same group. The value of $B_{ij}$ in $$B_{ij} = A_{ij} - \frac{k_i k_j}{2m},$$

where j∈G, would be the highest among all possible $B_{ij|i,j\in G}$. Consequently, the corresponding element in $u_{max}$ would have the largest magnitude among its group members.

Figure 5:
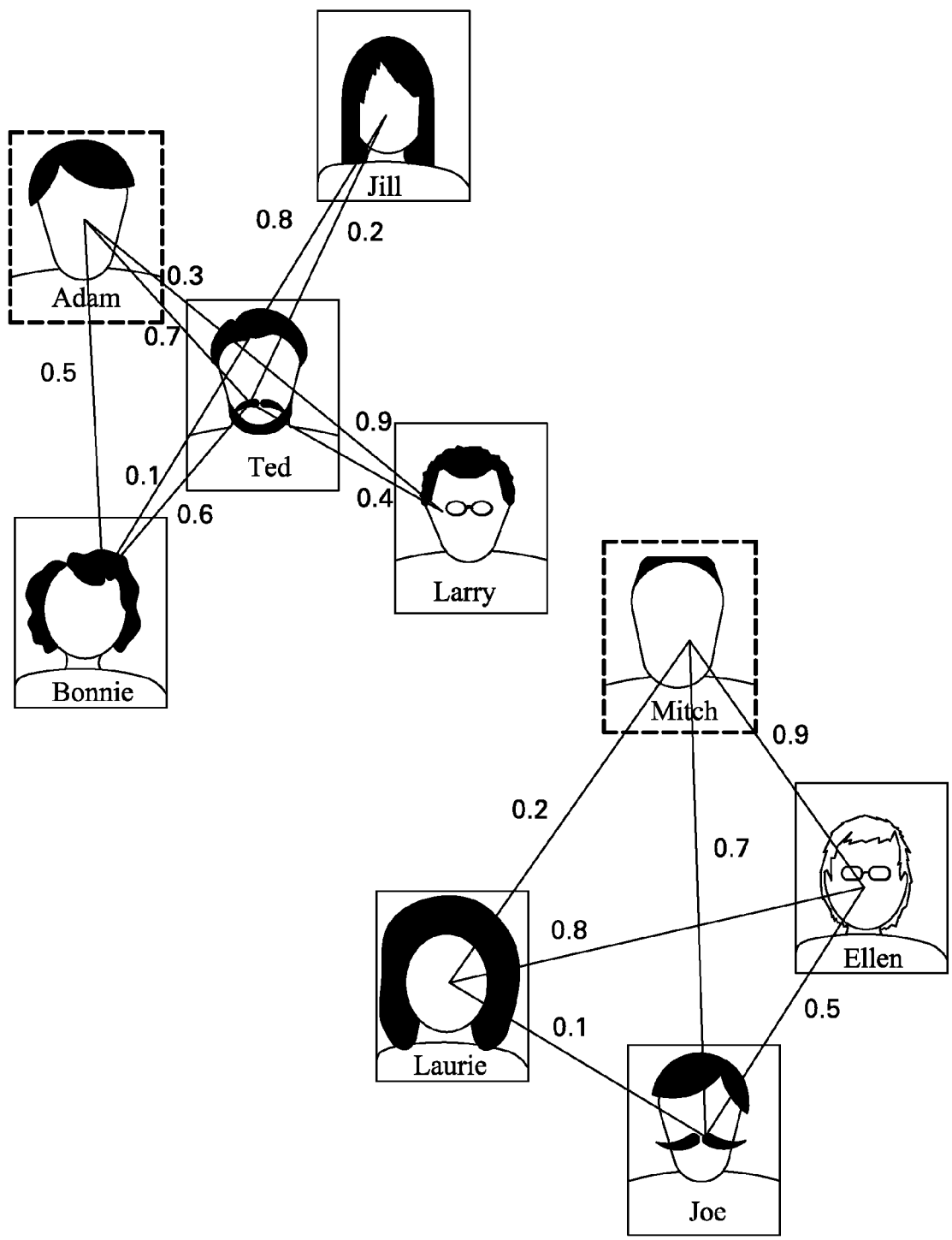
FIG. 5 is a schematic diagram of two social groups derived from the social network graph of FIG. 4 according to an embodiment of the present invention.

Two exemplary social groups derived from the social network graph of FIG. 4 are shown in FIG. 5. The first social group includes "Adam", "Jill", "Ted", "Bonnie", and "Larry". The second social group includes "Mitch", "Ellen", "Laurie", and "Joe". As depicted, the leaders of the social groups are estimated to be "Adam" and "Mitch", respectively.

Figure 6:
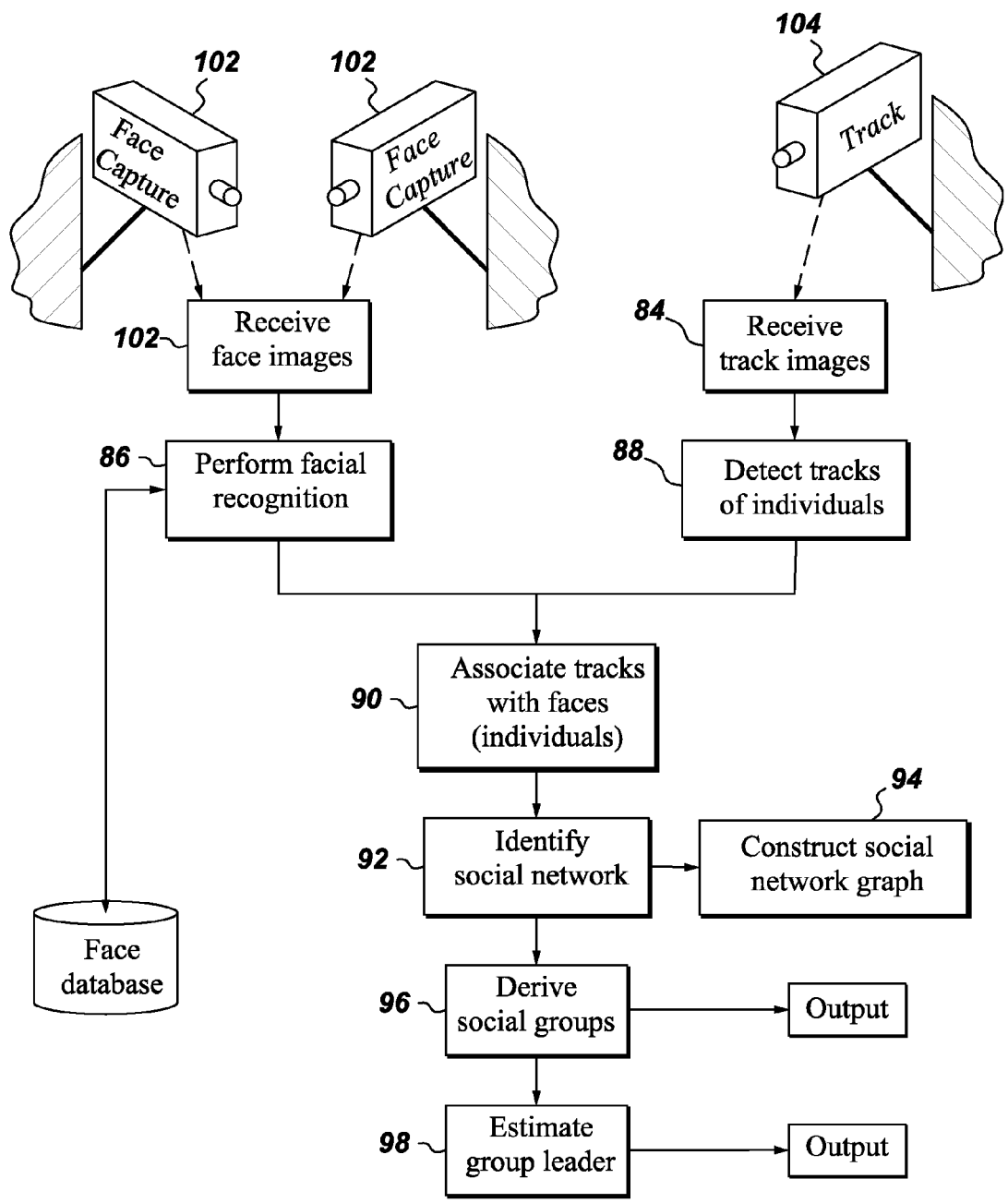
FIG. 6 is a flowchart depicting a method for discovering a social network according to an embodiment of the present invention.

A flowchart depicting a method for discovering a social network in accordance with an embodiment is illustrated in FIG. 6. The method comprises receiving facial images 82 from one or more of face capture (e.g., PTZ) cameras 102 of a camera system 100. Track images are received 84 from at least one tracking camera 104 of the camera system 100. Using facial data from the face database, facial recognition is performed 96 on the face images. Similarly, at 88 tracks of various individuals are detected from the track images. The method then associates the tracks with the faces (i.e., individuals) and/or other unique identifiers at 90. At 92 the social network is discovered and identified. The social network graph may be constructed at 94. After discovering the social network any social groups within the social network are derived at 96. Optionally, any group leader(s) of a social group are estimated at 98. Various outputs (e.g., data, printout, graphics, warning alarm, notifications, etc.) may be obtained from the method including information related to the social network, social group(s) (e.g., member identification, images, strength of relationships, time of identification, etc.), and/or group leader(s) (identification, name, image, relationship, etc.).

A fully integrated system comprising 4 fixed and 4 PTZ surveillance cameras, capable of capturing a total of 8 views, has been employed in experimental testing with success. A centralized 3D tracker utilized fixed cameras that provided the 3D locations of individuals in a common coordinate system. The track capabilities of the system were successful under occlusions, being able to track a dense crowd of individuals in a small courtyard with relatively a small number of errors. The tracks are then used to control the PTZ cameras to capture face images at high resolution. The system performed face detection and recognition on face images, and the recognized faces are then associated with the tracks so as to build the social network graph. The steps for building the social network graph and discovering social group scan optionally be performed offline as long as the tracks and face images captured online are properly stored.

The face detection and recognition components were evaluated on a section of video containing a single subject. The system managed to capture faces in about 40% of the frames out of which 49% are deemed to be high-quality frontal faces. Over 98% of these are recognized with a correct recognition rate of about 88%. In the experiments it has been observed that the recognition confidence (i.e., the 'score' returned by the recognition engine) for correct matches is significantly larger than the confidence for incorrect matches.

Table 1 are the results of face detection and recognition performance after a video segment was groundtruthed and evaluated for accuracy.

TABLE 1

| Nr. of Frames: | 2156 | Face Detections: | 843 |
|---|---|---|---|
| Frontal Detections: | 411 | Recognitions: | 403 |
| Correct Recog.: | 353 | Recog. Rate: | 88% |
| Rank 2: | 14 | Rank 7: | 1 |
| Rank 3: | 2 | Rank 8: | 1 |
| Rank 4: | 2 | Rank 9: | 1 |
| Rank 5: | 4 | Rank 10: | 1 |
| Rank 6: | 1 | Rank ≧11: | 23 |

The association algorithm for face-to-track association was evaluated for performance. The ideal experiment would be to compare the face-to-track associations returned by the graph-cut solution to the groundtruth obtained from manually associating faces with their tracks. This is a prohibitive task considering the large number of recognized faces even for a single track as shown in Table 1. Instead, each track (the number of tracks is significantly smaller than number of faces) was manually labeled with the identity of the individual that this track is following. Given that multiple faces are associated with each rack in the graph-cut solution, majority voting was performed whereby the most frequently recognized individual for this track is assigned to it. For computational reasons, the graph-cut optimization was performed for temporally partitioned segments of the tracks. Therefore, the majority voting procedure is conducted for these track segments. The groundtruth labels and the labels form our solution are then compared.

Three videos sequences contained a total 19,400 frames and 56 tracks were groundtruthed. Each track was labeled with the identity of the individual that it was following, and then compared with the results from the graph-cut solution. The comparative results are shown in Table 2:

|  | Seq #1 | Seq #2 | Seq #3 |
|---|---|---|---|
| Nr. of Frames: | 7000 | 5400 | 7000 |
| Nr. of Tracks: | 20 | 14 | 22 |
| Nr. of Segments: | 364 | 267 | 904 |
| Recognized: | 352 | 264 | 597 |
| Correct Recog.: | 336 | 255 | 470 |
| Wrong Recog.: | 16 | 9 | 127 |
| Recog. Rate: | 95% | 97% | 79% |

Sequence #1 contained 20 tracks, generating a total of 364 segments, among which 352 segments are recognized (some segments may not have associated with any faces, and thus remain unrecognizable). From these 352 segments, 336 are correctly recognized while only 16 are wrong, yield a recognition rate of 95%, which is higher than the face recognition rate shown in Table 1. For Sequence #2 and Sequence #3, a recognition rate of 97% and 79% respectively was obtained. While the recognition rate for sequence #3 is lower than the face recognition rate in Table 1, the amount of uncertainties for the latter is significantly lower since the test sequence contains only a single subject. Uncertainties were caused by crowded conditions, errors in the projection matrix estimations of the PTZ cameras, and motion blur due to PTZ movements. Considering these uncertainties, the overall performance of the 3 sequences was highly satisfactory.

The robustness of the system in discovering social networks was evaluated. A totally of 23 human subjects participated in the experiments. The system managed to track each individual quite reliably under challenging conditions wherein 4 fixed camera views were used. The participants were instructed to mingle in a 3-group configuration. Based on this scenario, a social network was estimated. Based on the social network graph, the system discovered its social groups. The modularity-cut was able to discover the correct social groups.

The modularity cut with recursive division was compared with the normalized-cut criterion. The normalized-cut was not able to generate the correct groups when applied to the social network graph. The normalized-cut misplaced one individual in another group due to the weak connection that individual has with all the groups as a result of noise in the dataset.

By analyzing social network graphs containing different number of social groups we identified two main problems when using normalized-cut. First, it is non-trivial to set the cut size threshold, and we often have to attempt several different threshold values to achieve good performance. Second, normalized-cut is biased in favor of equal-sized social groups, which causes problems when social groups are uneven in group size. In contract, modularity-cut was able to correctly discover the social groups in most cases.

The algorithm's capability at identifying Eigen-leaders was demonstrated by running the modularity-cut on a long sequence, whereby different members of two groups are seen interacting at different times. The leader of each group is always present, which generated strong modularity connections between each leader and his/her group members. By identifying the resulting Eigen-leaders, the system successfully identified the leaders. Contrastingly, classical spectral clustering techniques that minimize cut size are unable to effectively identify such leaders.

While certain algorithms such as the graph-cut and modularity-cut are used in illustrative examples of the present invention herein it should be apparent to those in the art, that other methods and/or algorithms may be used under aspects of the present invention. For example, as camera technologies improve over time (e.g., facial recognition methodologies improve), other algorithms now known or later developed may obtain similar successful results under the present invention.

One skilled in the art of computer science will be able to combine the software created as described with appropriate general purpose or special purpose computer hardware, such as a microprocessor, to create a computer system or computer sub-system embodying embodiments of the invention. An apparatus or system in accordance with embodiments of the invention may be one or more processing systems including, but not limited to, a center processing unit (CPRU), memory, storage devices, communications links and devices, servers, I/O devices, or any subcomponents of one or more processing systems, including software, firmware, hardware or any combination of subset thereof, which include embodiments of the invention.

The computer program product of an embodiment of the invention is executable on a computer system for causing the computer system to perform a method of discovering social networks including a discovery method of the invention. The computer system includes a microprocessor, an input device, a display unit and an interface to either the Internet or a network such as Ethernet, and Intranet. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as floppy disk drive, optical disk drive, etc. The storage device can also be other similar means for loading computer programs or other instructions into the computer system. The computer system also includes a communication unit. The communication unit allows the computer to connect to other database and the Internet through an I/O interface. The communication unit allows the transfer as well as reception of data from other databases. The communication unit may include a modem, an Ethernet card, or any similar device that enables the computer systems to connect to databases and networks such as LAN, MAN, WAN, and the Internet. The computer system facilitates inputs from a user through an input device, accessible to the system through the I/O interface. Various modules may also be in the form of hardware units.

The computer system executes a set of instructions that are stored in one or more storage elements to process input data. The set of instructions may be a program instruction means. The storage elements may also hold data or other information as desired. The storage element may be in the form of an information source or a physical memory present in the processing machine.

The set of instructions may include various commands that instruct the processing machine to perform specific tasks such as the steps that constitute an embodiment of the method of the invention. The set of instructions may be in the form of a software program. Further, the software may be in the form of a collection of separate programs, a program module with a larger program or a portion of a program module. The software may also include modular programming in the form of object-oriented programming. The processing of input data by the processing machine may be in response to user commands, results of previous processing or a request made by another processing machine.

Figure 7:
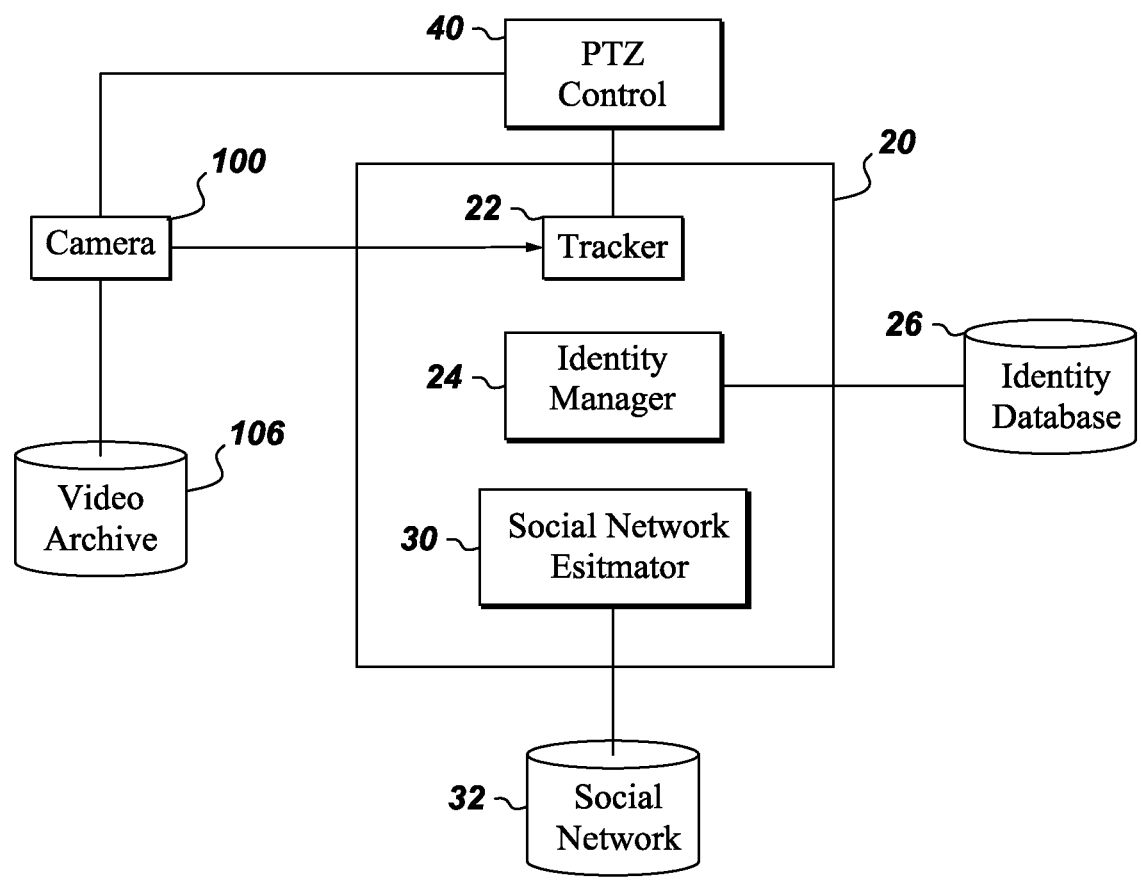
FIG. 7 is a schematic diagram of a system for discovering social networks incorporating aspects of the present invention.

A schematic diagram of a system employing a computer 20 for discovering social networks in accordance with an embodiment of the present invention is shown in FIG. 7. The computer 20 includes, for example, a tracker module 22, an identity manager 24, and social network estimator 30. The computer 20 and its modules may interact with a PTZ control 40, cameras 100, a video archive 106, a social network 32, and/or an identity database 26.

Therefore, according to one embodiment of the present invention, a computer implemented method for identifying individuals and associating tracks with individuals in camera-generated images, wherein the camera-generated images are from a camera system comprising at least one face capture camera and at least one tracking camera, said computer implemented method includes: receiving a plurality of images of an individual from the plurality of face capture cameras on a computer; receiving a plurality of images of at least one track of an individual from the at least one tracking camera on a computer; automatically determining with the computer the at least one track from the plurality of images from the at least one tracking camera; and associating with the computer the at least one track with at least one of the individual and a unique identifier.

According to another embodiment of the present invention, a system for identifying individuals and associating tracks with individuals includes: at least one camera configured to obtain a plurality of images of at least two individuals; a computer configured to process the plurality of images, wherein the computer: receives a plurality of images of the at least two individuals from the at least one camera; automatically determines at least two tracks from the plurality of images of the at least two individuals; associates the at least two tracks of the at least two individuals each with unique identifiers; and automatically identifies a social network from the at least two individuals that have been associated with unique identifiers.

According to another embodiment of the present invention, a computer implemented method for identifying individuals and associating tracks with individuals in camera-generated images, wherein the camera-generated images are from a camera system comprising at least one face capture camera and at least one tracking camera, said computer implemented method includes: receiving a plurality of images of the at least two individuals from the at least one camera; automatically determining at least two tracks from the plurality of images of the at least two individuals; associating the at least two tracks of the at least two individuals each with unique identifiers; and automatically identifying a social network from the at least two individuals that have been associated with unique identifiers.

According to another embodiment of the present invention, a computer-readable media having computer readable instructions recorded thereon for identifying individuals and associating tracks with individuals in camera-generated images, wherein the camera-generated images are from a camera system comprising at least one face capture camera and at least one tracking camera, the instructions include: instructions for receiving a plurality of images of an individual from the plurality of face capture cameras; instructions for receiving a plurality of images of at least one track of an individual from the at least one tracking camera; instructions for automatically determining the at least one track from the plurality of images from the at least one tracking camera; and instructions for associating the at least one track with at least one of the individual and a unique identifier.

The present invention has been described in terms of the preferred embodiment, and it is recognized that equivalents, alternatives, and modifications, aside from those expressly stated, are possible and within the scope of the appending claims.

The invention claimed is:

1. A computer implemented method for identifying individuals and associating tracks with individuals in camera-generated images, wherein the camera-generated images are from a camera system comprising at least one face capture camera and at least one tracking camera, said computer implemented method comprising:
    receiving a plurality of images of a plurality of individuals from the at least one face capture camera on a computer;
    receiving a plurality of images of at least one track along which the plurality of individuals moved from the at least one tracking camera on a computer;
    automatically determining with the computer the at least one track along which the plurality of individuals moved from the plurality of images from the at least one tracking camera;
    associating with the computer the at least one track along which the plurality of individuals moved with at least one of the plurality of individuals and a unique identifier; and
    identifying a social network with the plurality of individuals based upon a frequency that the plurality of individuals are co-located.

2. The method of claim 1, wherein the identifying further comprises assigning individuals having similar tracks to a particular social group.

3. The method of claim 1, further comprising identifying an individual by associating the individual with a predetermined list.

4. The method of claim 3, wherein the plurality of images comprises a plurality of face images and the identifying the individual further comprises:
    performing a facial recognition algorithm of the plurality of face images of the individual; and
    computing motion similarities between a plurality of images of at least one track along which the individual moved.

5. The method of claim 1, further comprising constructing a social network graph based on the social network.

6. The method of claim 5, further comprising deriving a plurality of social groups from the social network graph.

7. The method of claim 6 the deriving comprises applying a modularity-cut algorithm to the social network.

8. The method of claim 6 the deriving comprises applying an eigen-based algorithm to the social network.

9. The method of claim 6, further comprising estimating at least one group leader of at least one of the plurality of social groups.

10. The method of claim 9, the estimating comprises applying an eigen-based algorithm to estimate the at least one group leader.

11. The method of claim 1, wherein the camera system is located at a venue selected from a group consisting of: a prison, a shopping mall, a school, a public venue, a mass transit site, a public gathering, a financial company, and a sports venue.

12. The method of claim 1, the identifying comprising calculating motion similarities between two tracks on a ground plane.

13. The method of claim 12, the calculating comprising applying a graph-cut based algorithm.

14. The method of claim 1, comprising acquiring a plurality of high, resolution face images of the individual with the at least one face capture camera.

15. The method of claim 1, wherein the at least one face capture camera comprises one of a pan tilt zoom (PTZ) camera or high-resolution mega-pixel camera.

16. The method of claim 1, wherein the at least one tracking camera comprises a fixed surveillance camera.

17. A system for identifying a plurality of individuals and associating tracks with individuals comprising:
    at least one camera configured to obtain a plurality of images of the plurality of individuals;
    a computer configured to process the plurality of images, wherein the computer:
        receives a plurality of images of the plurality of individuals from the at least one camera;
        automatically determines at least two tracks along which the plurality of individuals moved from the plurality of images of the plurality of individuals;
        associates each of the at least two tracks along which the plurality of individuals moved with unique identifiers; and
        automatically identifies a social network based on a frequency that the plurality of individuals are co-located.

18. The system of claim 17, wherein the at least one camera comprises a high-resolution mega-pixel camera with a wide field of view.

19. The system of claim 17, wherein the at least one camera comprises a high-resolution catadioptric camera.

20. The system of claim 17 wherein the plurality of images comprises a plurality of facial images and wherein the computer performs operation comprising:
    performing a facial recognition algorithm of the plurality of facial images of an individual; and computing motion similarities between a plurality of images of at least one track along which the individual moved.

21. A computer implemented method for identifying a plurality of individuals and associating tracks with the plurality of individuals in camera-generated images, wherein the camera-generated images are from a camera system comprising at least one face capture camera and at least one tracking camera, said computer implemented method comprising:
  receiving a plurality of images of the plurality of individuals from the at least one camera;
  automatically determining at least two tracks along which the plurality of individuals moved from the plurality of images of the plurality of individuals;
  associating the at least two tracks along which the plurality of individuals moved with unique identifiers; and
  automatically identifying a social network for the plurality of individuals based upon a frequency that the plurality of individuals are co-located.

22. The computer implemented method of claim 21 wherein the plurality of images comprises a plurality of facial images and wherein the computer implemented method further comprises:
  performing a facial recognition algorithm of the plurality of facial images of an individual; and
  computing motion similarities between a plurality of images of at least one track along which the individual moved.

23. A non-transitory computer-readable media having computer readable instructions recorded thereon for identifying a plurality of individuals and associating tracks, with the plurality of individuals in camera-generated images, wherein the camera-generated images are from a camera system comprising at least one face capture camera and at least one tracking camera, the instructions comprising:
  instructions for receiving a plurality of images of the plurality of individuals from the at least one face capture camera;
  instructions for receiving a plurality of images of at least one track along which the plurality of individuals moved from the at least one tracking camera;
  instructions for automatically determining the at least one track along which the plurality of individuals moved from the plurality of images from the at least one tracking camera;
  instructions for associating the at least one track along which the plurality of individuals moved with at least one of an individual and a unique identifier; and
  identifying a social network with the plurality of individuals based upon a frequency that the plurality of individuals are co-located.

* * * * *